(12) United States Patent
Kimura et al.

(10) Patent No.: US 8,189,458 B2
(45) Date of Patent: May 29, 2012

(54) MONITORING SYSTEM, MONITORING DEVICE, MONITORED DEVICE, AND MONITORING METHOD

(75) Inventors: Yoshihiro Kimura, Kawasaki (JP);
Ikuko Tachibana, Kawasaki (JP);
Toshiaki Hayashi, Kawasaki (JP);
Takashi Tanifuji, Kawasaki (JP);
Yasutaka Tanikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 510 days.

(21) Appl. No.: 12/406,167

(22) Filed: Mar. 18, 2009

(65) Prior Publication Data

US 2009/0303884 A1    Dec. 10, 2009

(30) Foreign Application Priority Data

Jun. 6, 2008 (JP) ................................. 2008-148853

(51) Int. Cl.
*G06F 11/00* (2006.01)
(52) U.S. Cl. .............................. 370/216; 370/242; 714/2
(58) Field of Classification Search .......... 370/216–228, 370/242, 252; 714/2
See application file for complete search history.

(56) References Cited

U.S. PATENT DOCUMENTS

| 6,512,774 | B1 * | 1/2003 | Vepa et al. ..................... 370/242 |
| 6,567,377 | B1 * | 5/2003 | Vepa et al. ..................... 370/230 |
| 6,590,861 | B1 * | 7/2003 | Vepa et al. ..................... 370/242 |
| 7,020,796 | B1 * | 3/2006 | Ennis et al. ..................... 714/4.1 |
| 7,152,119 | B2 * | 12/2006 | Na et al. ......................... 370/420 |
| 7,152,179 | B1 * | 12/2006 | Critchfield ................... 714/4.11 |
| 2008/0008192 | A1 * | 1/2008 | Matoba ..................... 370/395.54 |

FOREIGN PATENT DOCUMENTS

JP    62-214449    9/1987
JP    4-257035    9/1992

* cited by examiner

*Primary Examiner* — Steven H Nguyen
(74) *Attorney, Agent, or Firm* — Staas & Halsey LLP

(57) ABSTRACT

A monitored device in a monitoring system sends a notification indicating device ID of a real computer and a real-MAC address thereof in advance to a monitoring device. The monitored device determines the real-MAC address corresponding to the computer in advance on the basis of the real-MAC address and an IP address of the computer and, when a failure occurs in any of the computers, also sends a notification indicating failure information including the virtual-MAC address and the IP address to the monitoring device. The monitoring device in the monitoring system obtains the real-MAC address on the basis of the IP address and the virtual-MAC address in the failure information, groups the failure information on the basis of the obtained real-MAC address, correlates the grouped failure information with the device ID, and outputs the correlated ID.

9 Claims, 16 Drawing Sheets

| DEVICE ID | OS | IP ADDRESS | NETMASK |
|---|---|---|---|
| 1001 | GEST OS31 | 192.168.10.1 | 255.255.255.0 |
| 1002 | GEST OS32 | 192.168.10.2 | 255.255.255.0 |
| 1003 | GEST OS33 | 192.168.10.3 | 255.255.255.0 |
| 1005 | HOST OS12 | 192.168.10.5 | 255.255.255.0 |

| DEVICE ID | OS | IP ADDRESS | NETMASK |
|---|---|---|---|
| 2001 | GEST OS31 | 192.168.10.1 | 255.255.255.0 |
| 2002 | GEST OS32 | 192.168.10.2 | 255.255.255.0 |
| 2003 | GEST OS33 | 192.168.10.3 | 255.255.255.0 |
| 2005 | HOST OS12 | 192.168.10.5 | 255.255.255.0 |

FIG.7A

| PHYSICAL DEVICE NAME | ACCESS DESTINATION |
|---|---|
| SDA | LOGICAL DISK 15 |
| SDB | LOGICAL DISK 16 |
| SDC | LOGICAL DISK 17 |
| LANA | LAN ADAPTER |

| OS | PHYSICAL DEVICE NAME | MAC ADDRESS | CLASS | STATE |
|---|---|---|---|---|
| HOST OS 12 | LANA | 00-00-0E-12-10-00 | 1 | 0→1 |

| DEVICE ID | IP ADDRESS | NETMASK | MAC ADDRESS | TYPE | CLASS |
|---|---|---|---|---|---|
| 1005 | 192.168.10.5 | 255.255.255.0 | 00-00-0E-12-10-00 | 0 | 1 |

133

| MARK A |
|---|
| 0→1 |

| VIRTUAL SERVER | LOGICAL DEVICE NAME | PHYSICAL DEVICE NAME |
|---|---|---|
| #1 | SD1 | SDA |
| | LAN1 | LANA |
| #2 | SD2 | SDB |
| | LAN1 | LANA |
| #3 | SD3 | SDC |
| | LAN1 | LANA |

FIG.9B 142

| OS | LOGICAL DEVICE NAME | VIRTUAL MAC ADDRESS | STATUS |
|---|---|---|---|
| GEST OS31 | LAN1 | 00-00-0E-12-10-00 | O |
| GEST OS32 | LAN1 | 00-00-0E-12-10-00 | O |
| GEST OS33 | LAN1 | 00-00-0E-12-10-00 | O |

FIG.10A

| OS | LOGICAL DEVICE NAME | MAC ADDRESS | CLASS | STATUS |
|---|---|---|---|---|
| HOST OS12 | LAN1 | 00-00-0E-12-10-05 | 0 | 0→1 |

| DEVICE ID | IP ADDRESS | NETMASK | MAC ADDRESS | TYPE | CLASS |
|---|---|---|---|---|---|
| 1005 | 192.168.10.5 | 255.255.255.0 | 00-00-0E-12-10-05 | 0 | 0 |

152

| MARK B |
|---|
| 0→1 |

| LOGICAL DEVICE NAME | ACCESS DESTINATION |
|---|---|
| SD2 | LOGICAL DISK16 |
| SD3 | LOGICAL DISK17 |
| LAN1 | VIRTUAL LAN ADAPTER |

| OS | LOGICAL DEVICE NAME | MAC ADDRESS | STATUS |
|---|---|---|---|
| GEST OS31 | LAN1 | 00-00-0E-12-10-00 | 0 |
| GEST OS32 | LAN1 | 00-00-0E-12-10-02 | 1 |
| GEST OS33 | LAN1 | 00-00-0E-12-10-03 | 1 |

| DEVICE ID | IP ADDRESS | NET MASK | MAC ADDRESS | TYPE | CLASS |
|---|---|---|---|---|---|
| 1002 | 192.168.10.2 | 255.255.255.0 | 00-00-0E-12-10-02 | 0 | 0 |
| 1003 | 192.168.10.3 | 255.255.255.0 | 00-00-0E-12-10-03 | 0 | 0 |

MARK C
0→1

FIG.14

| DEVICE ID | IP ADDRESS | MAC ADDRESS | CONTENT OF FAILURE | TYPE |
|---|---|---|---|---|
| 1005 | 192.168.10.5 | 00-00-00-0E-12-10-05 | ERROR NUMBER | 1 |
| 1002 | 192.168.10.2 | 00-00-00-0E-12-10-02 | ERROR NUMBER | 1 |
| 2001 | 192.168.10.1 | 00-00-00-0E-12-20-01 | ERROR NUMBER | 1 |

| DEVICE ID | IP ADDRESS | NETMASK | MAC ADDRESS | CLASS |
|---|---|---|---|---|
| 1002 | 192.168.10.2 | 255.255.255.0 | 00-00-0E-12-10-02 | 0 |
| 1003 | 192.168.10.3 | 255.255.255.0 | 00-00-0E-12-10-03 | 0 |
| 1005 | 192.168.10.5 | 255.255.255.0 | 00-00-0E-12-10-05 | 0 |
| 1005 | 192.168.10.5 | 255.255.255.0 | 00-00-0E-12-10-00 | 1 |
| 2001 | 192.168.10.1 | 255.255.255.0 | 00-00-0E-12-20-01 | 0 |
| 2005 | 192.168.10.5 | 255.255.255.0 | 00-00-0E-12-20-05 | 0 |
| 2005 | 192.168.10.5 | 255.255.255.0 | 00-00-0E-12-20-00 | 1 |

181

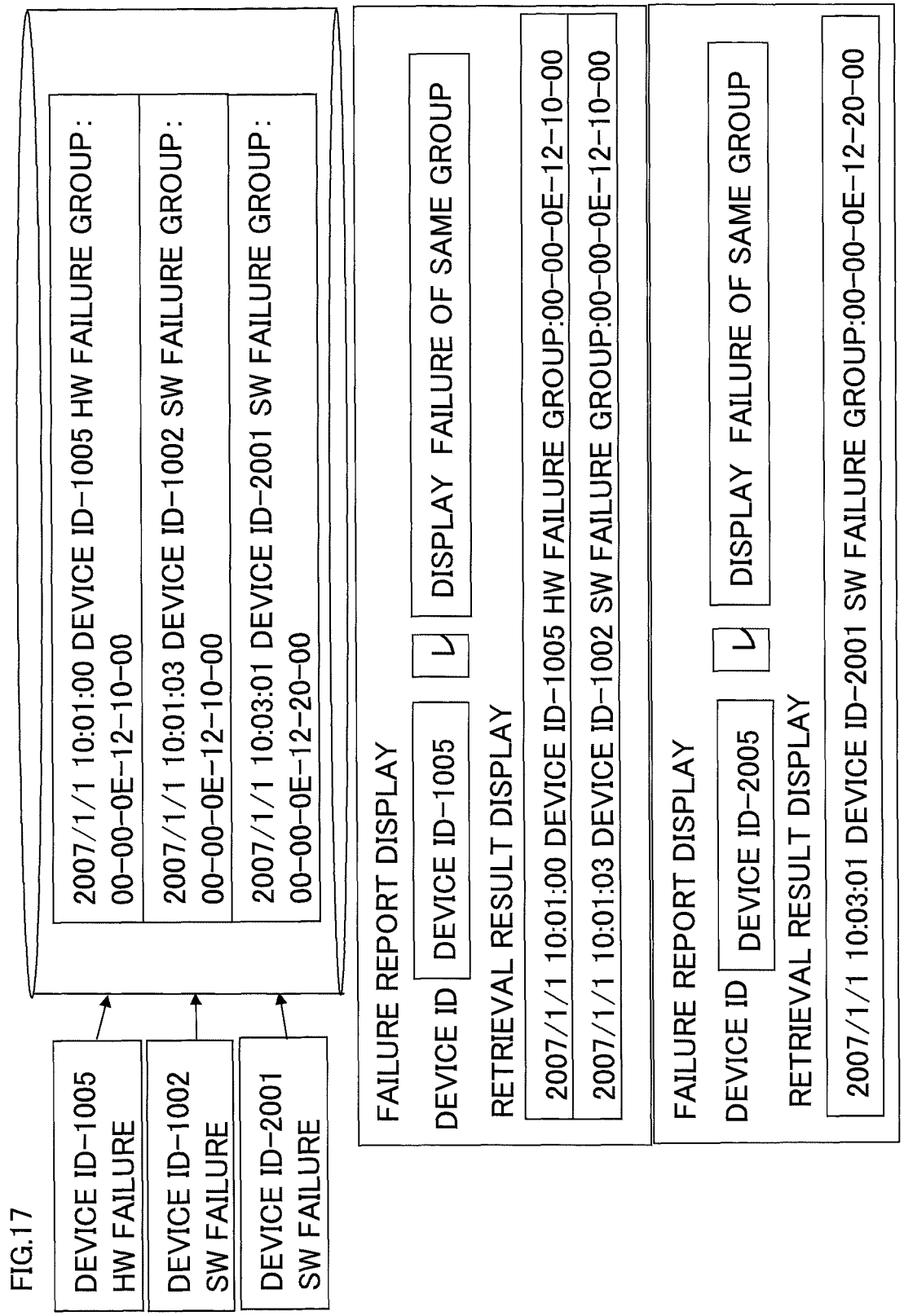

MONITORING SYSTEM, MONITORING DEVICE, MONITORED DEVICE, AND MONITORING METHOD

CROSS-REFERENCE TO RELATED APPLICATIONS

This application is based upon and claims the benefit of priority of the prior Japanese Patent Application No. 2008-148853, filed on Jun. 6, 2008, the entire contents of which are incorporated herein by reference.

FIELD

The embodiment discussed herein is related to a monitoring system.

BACKGROUND

In a remote monitoring system having a server of a monitored device and a monitoring center, when the server detects that abnormality is found, the abnormality is informed from the server to the monitoring center via a network.

The server is divided into a plurality of logical devices (virtual servers) by improvement of performance, and the virtual servers operate. Further, on a guest OS used for virtual server, the security is improved between a host OS and the guest OS and between the guest OSs, thereby limiting a mutual accessible range. Further, when the virtual servers perform an operation, software such as the guest OS is arranged on a shared disk to be started from an alternate server, and the guest OS can be started from two servers. With the system, if hardware of the server that is operated is broke down, the software such as the guest OS is restarted from the alternate server, and the operation continues.

The guest OS of the virtual server cannot read information on the hardware. Therefore, only information collected in the host OS or the guest OS is sent to the monitoring center.

In the system, the server of a monitored device can detect abnormality on the software operated on the guest OS due to a failure of the hardware. In this case, the abnormality of the hardware and the abnormality of the software are notified to the monitoring center, respectively. The monitoring center cannot correlate the hardware and the software with a fact as whether or not the hardware and the software are operated on the same server. Because there is not information on the hardware that specifies the server with respect to the abnormality information on the software. As a consequence, a support person that supports failure and recovery on the basis of notification of the monitoring center requires operation for specifying the server with respect to the abnormality information on the software. Therefore, the determination that the two pieces of the abnormality information are notified from the same server cannot be immediately performed.

SUMMARY

According to an aspect of the invention, a monitoring system includes a monitored device for operating virtual computers on a real computer and a monitoring device for monitoring failure state of the monitored device. The monitored device includes a initial information notification unit for transmitting initial information having device identification information of the real computer and real MAC address of the real computer, a determination unit for determining virtual MAC address of the computer on the basis of the real MAC address of the real computer and IP address of the computer, and a failure information notification unit for transmitting failure information having the virtual MAC address of a failured computer and the IP address of the failured computer upon the computer failure occurring. The monitoring device for monitoring failure state of the monitored device, said monitoring device includes a storage unit for storing the initial information received from the monitored device, a obtaining unit for obtaining the real MAC address of the real computer on the basis of IP address and the virtual MAC address in the failure information received from the monitored device, a group processing unit for grouping the failure information on the basis of the obtained real MAC address, and for correlating the grouped failure information with the device identification information in the initial information, and an output unit for outputting the failure information correlated with the device identification information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 4A and 4B are explanatory diagrams of device ID tables;

FIGS. 7A to 7C are explanatory diagrams of tables corresponding to the starting processing of the host OS;

FIGS. 9A and 9B are explanatory diagrams of tables corresponding to creating processing of the virtual server;

FIGS. 10A and 10B are explanatory diagrams of tables corresponding to virtualizing processing of the host OS;

FIGS. 12A to 12C are explanatory diagrams of tables corresponding to starting processing of the guest OS;

FIG. 14 is an explanatory diagram of failure information;

FIG. 16 is an explanatory diagram of a monitoring table; and

FIG. 17 is a diagram illustrating a display example.

DESCRIPTION OF EMBODIMENT

Figure 1:
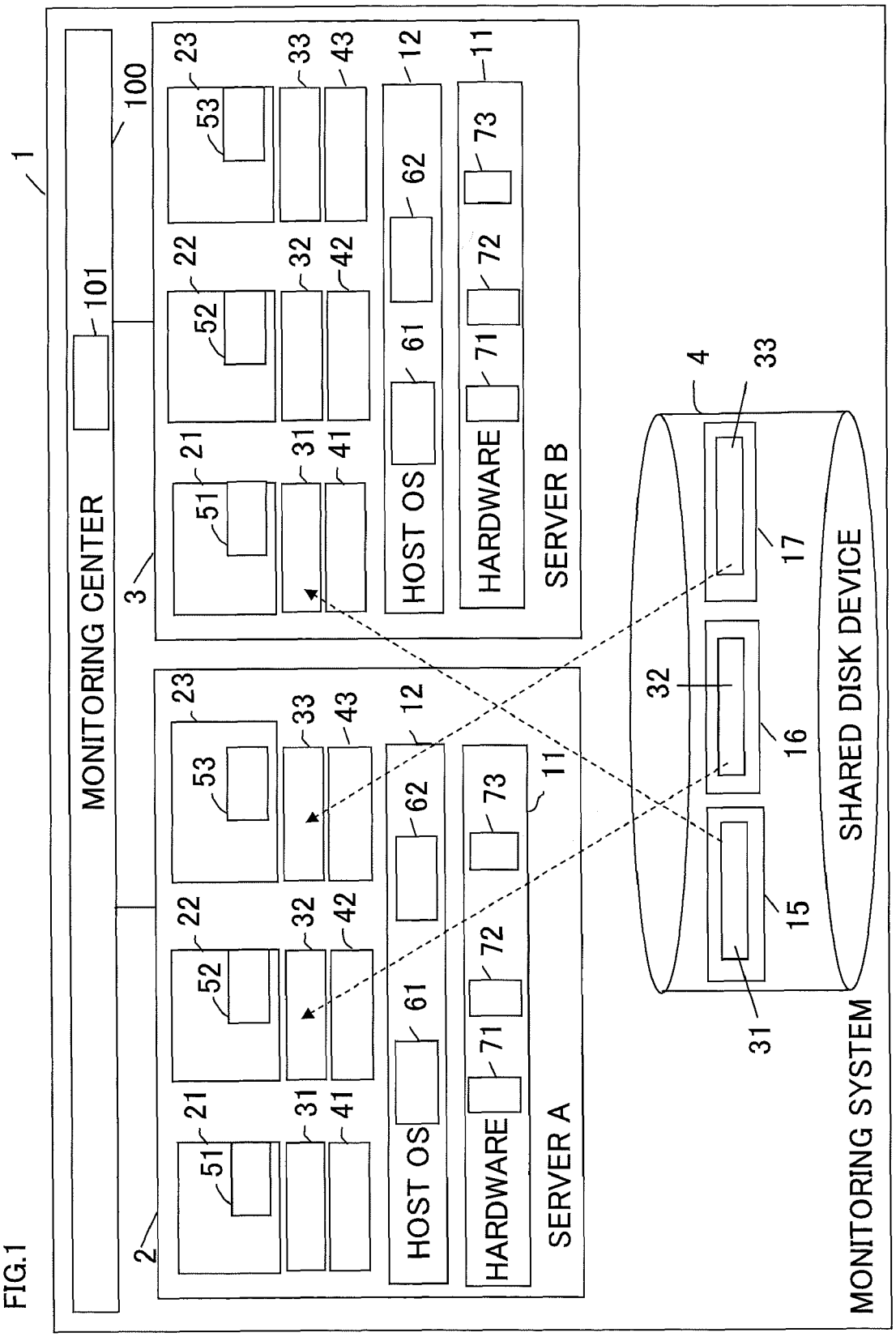
FIG. 1 is a diagram illustrating structure of a monitoring system.

FIG. 1 is a diagram illustrating structure of a monitoring system according to an embodiment.

A monitoring system 1 according to the embodiment includes a monitoring center 100 as a monitoring device and two servers A2 and B3 as monitored devices. The servers A2 and B3 are connected to a shared disk device 4.

The monitoring center 100 has a monitoring processing unit 101 that remotely monitors the servers A2 and B3 via the network so as to monitor a failure.

The monitoring processing unit 101 obtains physical real-MAC addresses of the servers A2 and B3 from failure information notified from the servers A2 and B3. Further, the monitoring processing unit 101 groups the failure information on the basis of the obtained physical real-MAC addresses. The MAC address is a Media Access Control address. Subsequently, the monitoring processing unit 101 correlates device identification information (hereinafter, referred to as device ID) of the server to the grouped failure information, and sends a notification indicating the resultant information to the support person.

As a consequence, the failure information of the same hardware is collected as the same failure information group and is correlated therewith, and the support person can deal with the failure. Therefore, the separation of the software and the hardware due to the hardware failure is possible and easy. When maintenance is required, the support person thus goes out for maintenance of the server A2 or B3 with a necessary substitute part and provides a proper maintenance service.

The servers A2 and B3 that are the monitored device are devices in a duplicated system used for the operation system by a client.

The server A2 comprises: hardware 11; a host OS 12; application software 21 to 23; guest OSs 31 to 33; and virtual hardware 41 to 43. The guest OSs 31 to 33 and the virtual hardware 41 to 43 are software. The server A2 can create three virtual servers #1 to #3 with the guest OSs 31 to 33. Further, the virtual servers #1 to #3 are operated as one computer, respectively. Different OSs and different application software 21 to 23 are simultaneously executed.

The virtual server #1 has the application software 21, the guest OS 31, and the virtual hardware 41. The virtual server #2 has the application software 22, the guest OS 32, and the virtual hardware 42. The virtual server #3 has the application software 23, the guest OS 33, and the virtual hardware 43.

The servers B3 and A2 have the common hardware and software. The server B3 can create three virtual servers #4 to #6 with the guest OSs 31 to 33. The virtual server #4 has the application software 21, the guest OS 31, and the virtual hardware 41. The virtual server #5 has the application software 22, the guest OS 32, and the virtual hardware 42. The virtual server #6 has the application software 23, the guest OS 33, and the virtual hardware 43.

The shared disk device 4 stores software such as the guest OSs 31 to 33 that can be executed on the virtual servers of the servers A2 and B3. The shared disk device 4 allocates the software of the guest OSs 31 to 33, corresponding to three logical disks 15 to 17. The guest OSs 31 to 33 can be started from both the servers A2 and B3.

The hardware 11 has a processor 71, a LAN adaptor 72, and a memory 73. The processor 71 excites various processing in accordance with a command from the software loaded to the memory 73.

The LAN adaptor 72 connects the monitoring center 100 to the server A2, or the monitoring center 100 to the server B3.

The memory 73 stores the software, tables, etc.

The host OS 12 controls the hardware 11 for each of the servers A2 and B3, and further controls the virtual servers #1 to #3 or virtual servers #4 to #6. The host OS 12 has a failure processing unit 61 and a monitoring agent 62. The details will be described later. The hardware 11 and the host OS 12 are examples of a real computer.

The guest OSs 31 to 33 manage the corresponding virtual servers #1 to #6.

The virtual servers #1 to #6 execute the application software 21 to 23 for client's operation system under the guest OSs 31 to 33. The application software 21 to 23 has the monitoring agents 51 to 53 that monitor the abnormality states of the virtual servers #1 to #6. The virtual servers #1 to #6 are examples of a virtual computer. Further, the guest OSs 31 to 33 have determination units (not illustrated) for determining the virtual-MAC addresses. The determination unit has the same function as that of the virtual-MAC address determination unit 82 of the host OS 12, which will be described later.

The monitoring agents 51 to 53 send a notification indicating the initial information and failure information to the monitoring center 100. Processing executed by the monitoring agents 51 to 53 is similar to that of the monitoring agent 62, which will be described later.

The virtual hardware 41 to 43 emulate the hardware 11. Therefore, the virtual hardware 41 to 43 does not a function for identifying the failure position of the hardware 11. Thus, upon causing a failure, the virtual servers #1 to #6 send a notification indicating a fault of the software to the monitoring center 100. Virtual LAN adaptors are provided as the virtual hardware 41 to 43.

Figure 2:
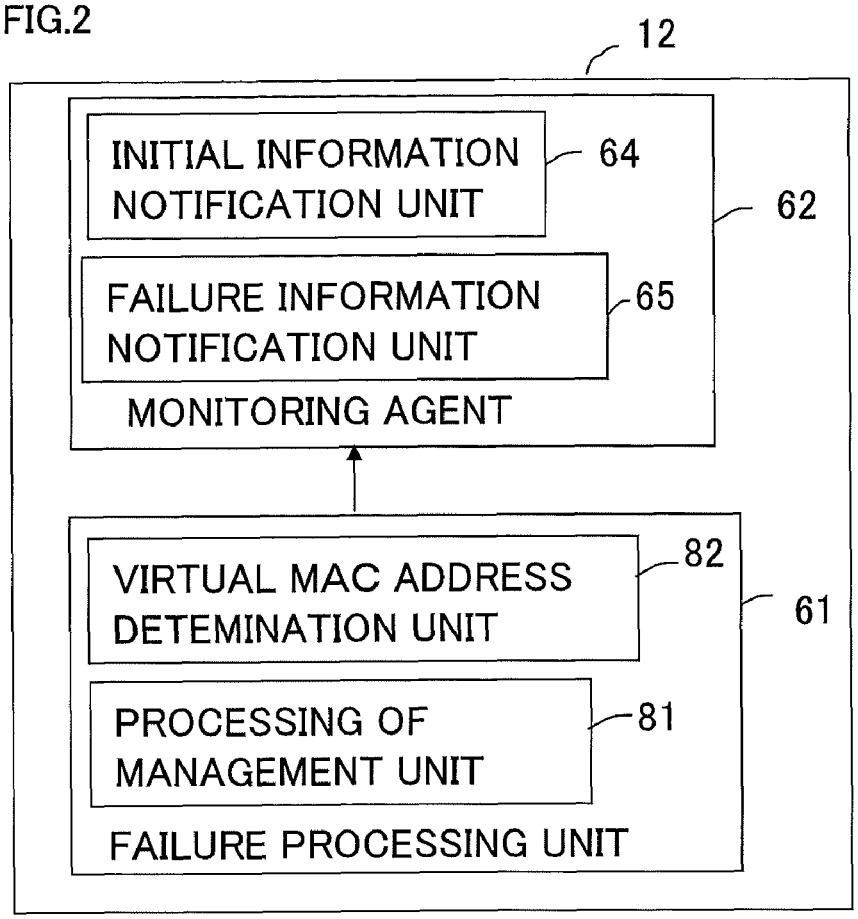
FIG. 2 is an explanatory diagram of a host OS.

FIG. 2 is an explanatory diagram illustrating the host OS.

The host OS 12 has the failure processing unit 61 and the monitoring agent 62 for monitoring the failure.

The failure processing unit 61 has a process management unit 81 and the virtual-MAC address determination unit 82.

The process management unit 81 manages monitoring processing of the failure. For example, as the processing of the management unit 81, there is starting processing of the host OS 12, virtual server creating processing, setting processing of the virtual LAN adaptor of the host OS 12, and starting processing of the virtual server.

The virtual-MAC address determination unit 82 determines the virtual-MAC address of the virtual LAN adaptor managed by the host OS 12. A conversion formula from the real-MAC address to the virtual-MAC address is as follows.

$$\text{Virtual MAC address} = \text{real-MAC address} + (\text{IP address} - \text{network address}).$$

The monitoring agent 62 has an initial-information notification unit 64, and a failure information notification unit 65.

The initial-information notification unit 64 sends a notification indicating initial information having the device ID, IP address, MAC address, type, and class of the server to the monitoring center 100 upon starting the server. The "type" distinguishes whether the initial information or the failure information is notified to the monitoring center 100. When the type is the initial information, "0" is set to the type. The "class" distinguishes whether the MAC address is information of the real-MAC address or information of the virtual-MAC address. A class "1" indicates the real-MAC address, and a class "0" indicates the virtual-MAC address.

The IP address is an Internet Protocol address.

The failure information notification unit 65 sends, to the monitoring center 100, a notification indicating failure information having the device ID, IP address, MAC address, and type of the server in which the failure occurs upon generating the failure. When the information is failure information, "1" is set to the type. Upon sending a notification indicating the failure information, the virtual-MAC address is notified as the MAC address.

Figure 3:
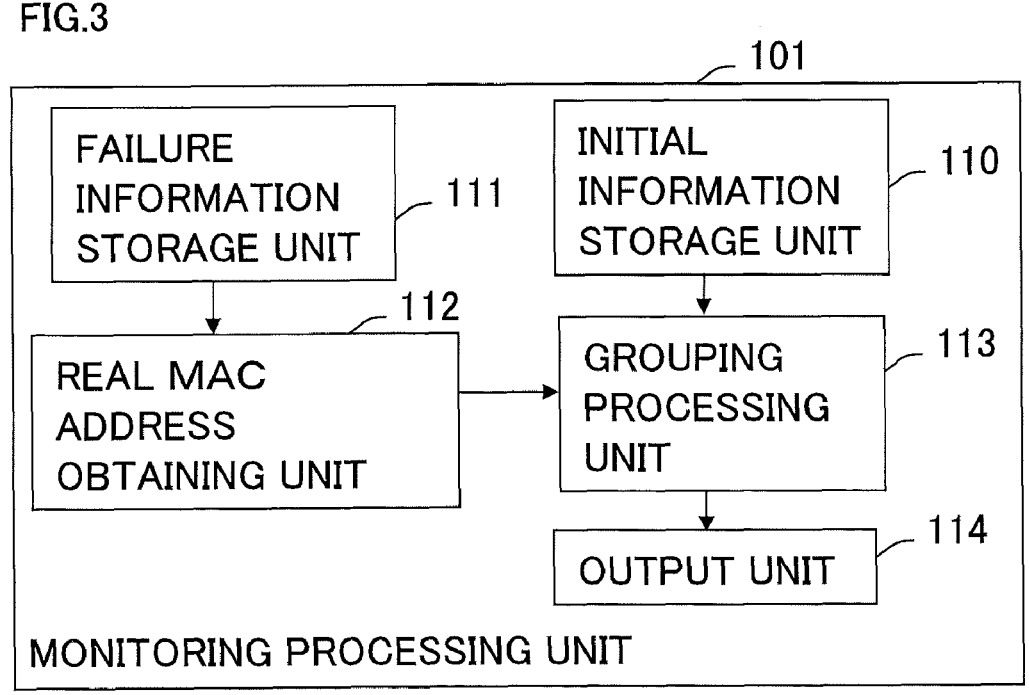
FIG. 3 is an explanatory diagram of a monitoring processing unit.

FIG. 3 is an explanatory diagram illustrating a monitoring processing unit.

The monitoring processing unit 101 comprises: an initial information storage unit 110; a failure information storage unit 111; a real-MAC address obtaining unit 112; a grouping processing unit 113; and an output unit 14.

The initial information storage unit 110 is a memory that stores the initial information from the servers A2 and B3.

The failure information storage unit 111 is a memory that stores the failure information and grouping information from the servers A2 and B3.

The real-MAC address obtaining unit 112 converts and obtains the real-MAC address of the server in which the failure occurs from the IP address included in the received failure information and the virtual-MAC address. The conversion formula is as follows.

Real MAC address=virtual-MAC address−((IP address)−(network address)).

The grouping processing unit 113 groups the failure information to the real-MAC address. Further, the grouping processing unit 113 correlates the device ID in the initial information with the real-MAC address, stores the result to the failure information storage unit 111, and outputs the stored result to the output unit 114.

The output unit 114 displays various information.

FIGS. 4A and 4B are explanatory diagrams illustrating device ID tables.

A device ID table 121 stores the device ID, OS name, IP address, and a subnet mask for every server. Further, the device ID table 121 is set upon arranging the device and is stored to the memory 73.

FIG. 4A illustrates a device ID table 121a of the server A2 that stores device information included in the server A2.

Device IDs 1001 to 1003 illustrated in FIG. 4A correspond to the guest OSs 31 to 33. A device ID 1005 in FIG. 4A corresponds to the host OS 12.

FIG. 4B illustrates a device ID table 121b of the server B3 that stores information on the device included in the server B3.

Device IDs 2001 to 2003 illustrated in FIG. 4B correspond to the guest OSs 31 to 33. A device ID 2005 in FIG. 4B corresponds to the host OS 12.

A description will be given of a flow of operation upon starting the server A2 as an example with reference to FIGS. 5 to 13.

In the example, the server A2 uses the guest OSs 32 and 33, and the server B3 uses the guest OS 31.

Figure 5:
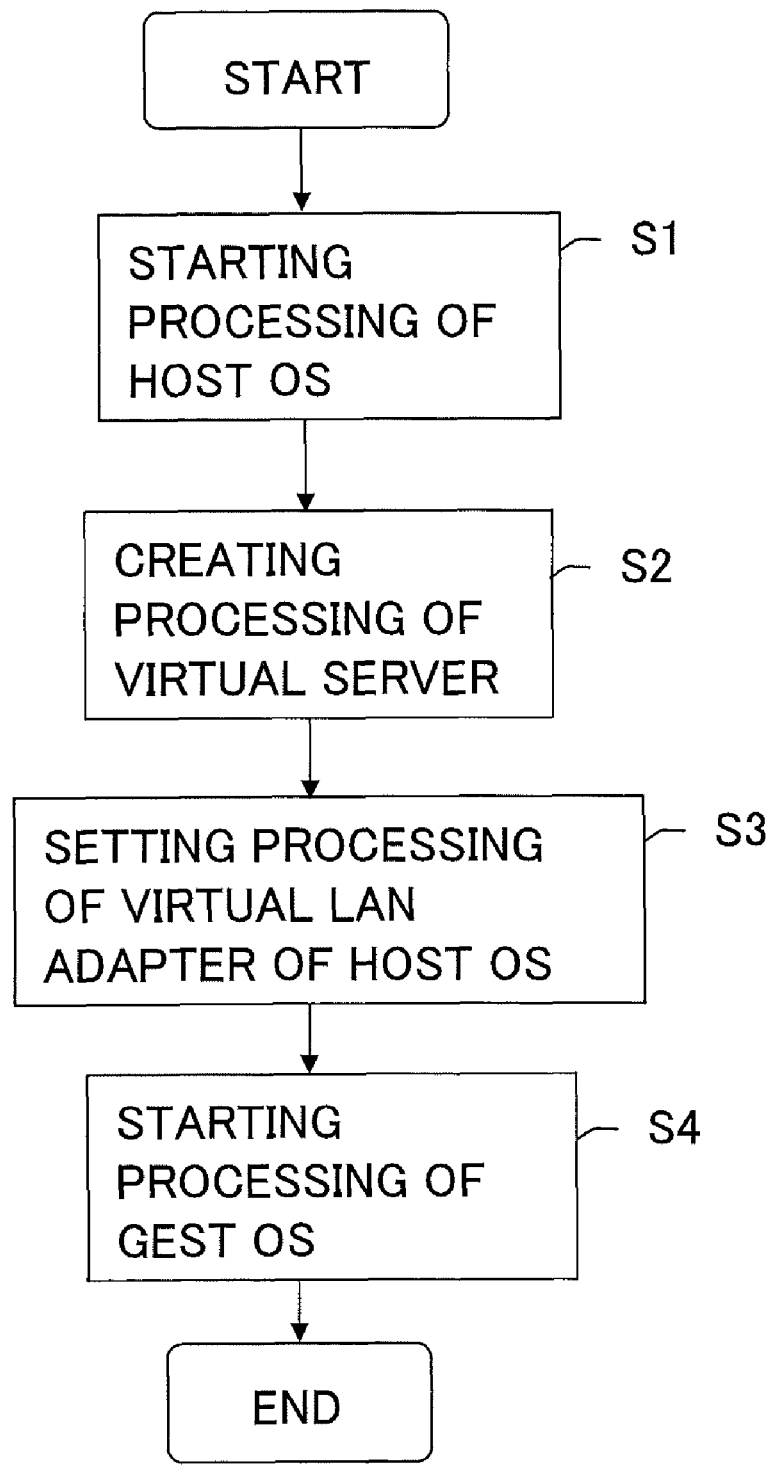
FIG. 5 is a flowchart of processing of the monitoring system.

FIG. 5 is a flowchart of processing of the monitoring system.

The server A2 is started, thereby performing starting processing of the host OS 12 (in step S1).

Next, a description will be given of the details in step S1 in FIG. 5 with reference to FIGS. 6 and 7.

Figure 6:
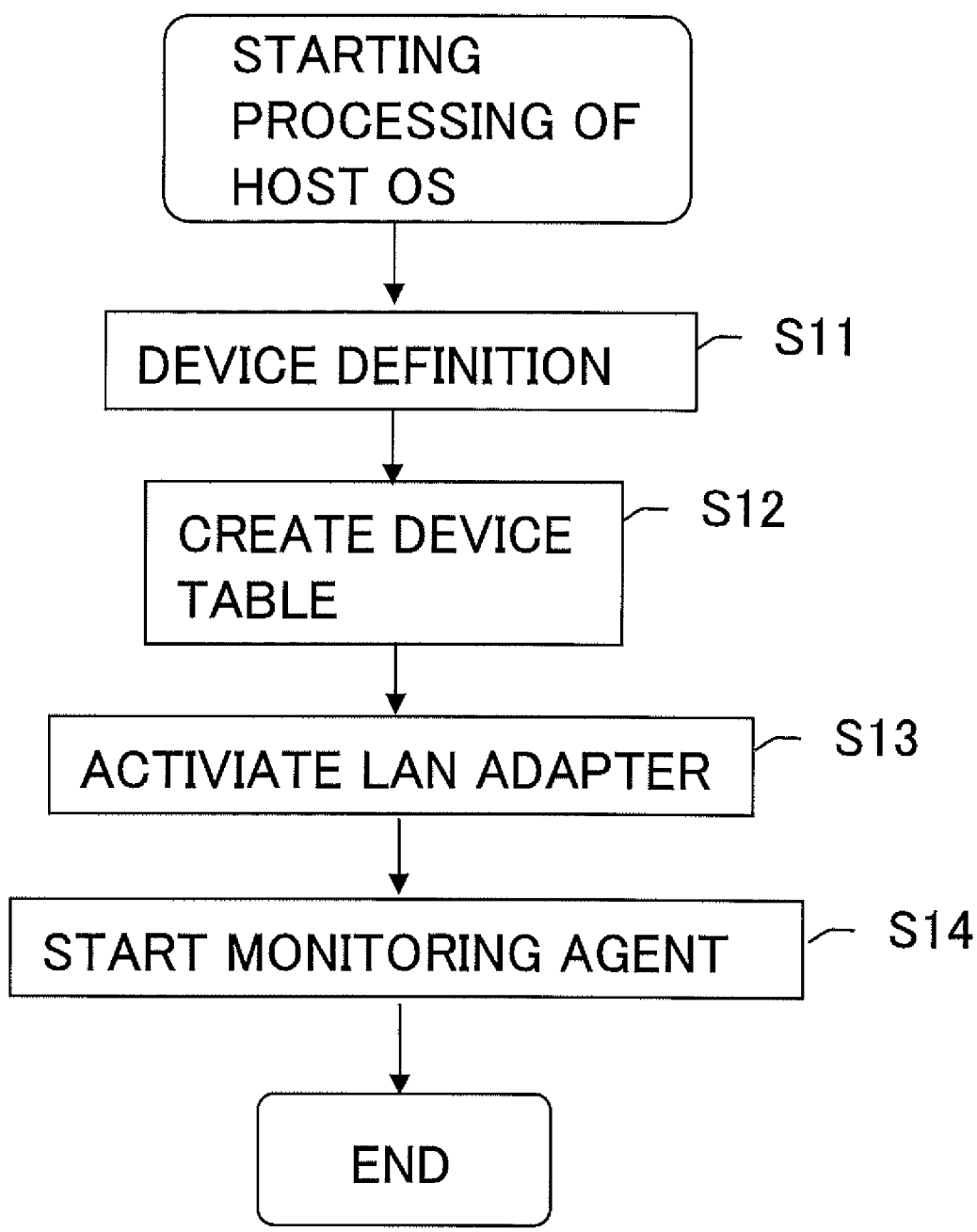
FIG. 6 is a flowchart of starting processing of the host OS.

FIG. 6 is a flowchart of the starting processing in the host OS.

First of all, a device of the host OS 12 is defined (in step S11).

Specifically, the host OS 12 recognizes the shared disk device 4 or LAN adaptor 72 connected to the server A2, and creates a correspondence between a physical device name accessible from the host OS 12 and a connecting device as a device name table A131.

FIGS. 7A to 7C are explanatory diagrams illustrating the tables corresponding to starting processing of the host OS.

FIG. 7A illustrates a device name table A131 that stores device information corresponding to the host OS 12. A physical device name sda illustrates a logical disk 15. A physical device name sdb illustrates a logical disk 16. A physical device name sdc illustrates a logical disk 17. Further, a physical device name lana denotes a LAN adaptor 72.

Subsequently, the host OS 12 reads the MAC address that is set in the LAN adaptor 72, and creates a device table A132 indicating a correspondence between the physical device name lana and the MAC address (in step S12 in FIG. 6).

FIG. 7B illustrates a device table A132. An example will be illustrated in which an MAC address corresponding to the physical device name lana is "00-00-0e-12-10-00". A class "1" illustrates that the MAC address recorded to the device table A132 is a real-MAC address. Further, a state indicating activation is "0". A state "0" indicates inactivation.

Subsequently, the host OS 12 reads the device ID and the IP address and subnet mask corresponding to the device ID, from the device ID table 121a illustrated in FIG. 4. In the example, information corresponding to the host OS 12 is read. Further, the MAC address is read from the device table A132 illustrated in FIG. 7B. Furthermore, the host OS 12 creates initial information A133 on the host OS 12 on the basis of both the information, and stores the created information to the memory 73. In this case, a mark A134 that is already transmitted, corresponding to the initial information A133, is created as "0", and is then stored to the memory 73.

FIG. 7C illustrates the initial information A133 on the host OS 12 of the server A2, for being transmitted to the monitoring center 100. The initial information A133 comprises the device ID 1005 of the host OS 12, an IP address 192.168.10.5, a subnet mask 255.255.255.0, an MAC address 00-00-0e-12-10-00, the type "0", and the class "1". The type "0" indicates that the information is the initial one, and the class "1" indicates a real-MAC address.

Subsequently, the LAN adaptor 72 is activated (in step S13 in FIG. 6). At this time, the host OS 12 changes a state indicating the activation of the device table A132 from "0" to "1". A state "1" indicates "activation" (refer to FIG. 7B).

Subsequently, the host OS 12 starts the monitoring agent 62 (in step S14 in FIG. 6).

Further, the monitoring agent 62 detects the state "1" indicating the activation of the device table A132, and detects that the mark A134 already-transmitted, corresponding to the initial information A133 illustrated in FIG. 7C is "0". Then, the monitoring agent 62 sends a notification indicating the initial information A133 to the monitoring center 100.

The initial information A133 is transmitted to the monitoring center 100. Then, the mark A134 already-transmitted, corresponding to the initial information A133 stored in the memory 73, is changed to "1" (refer to FIG. 7C).

The starting processing of the host OS 12 ends.

A description will be back to FIG. 5.

Subsequently, the host OS 12 performs creating processing of the virtual servers #1 to #3 (in step S2 in FIG. 5).

Subsequently, the details in step S2 in FIG. 5 will be described with reference to FIGS. 8 and 9.

Figure 8:
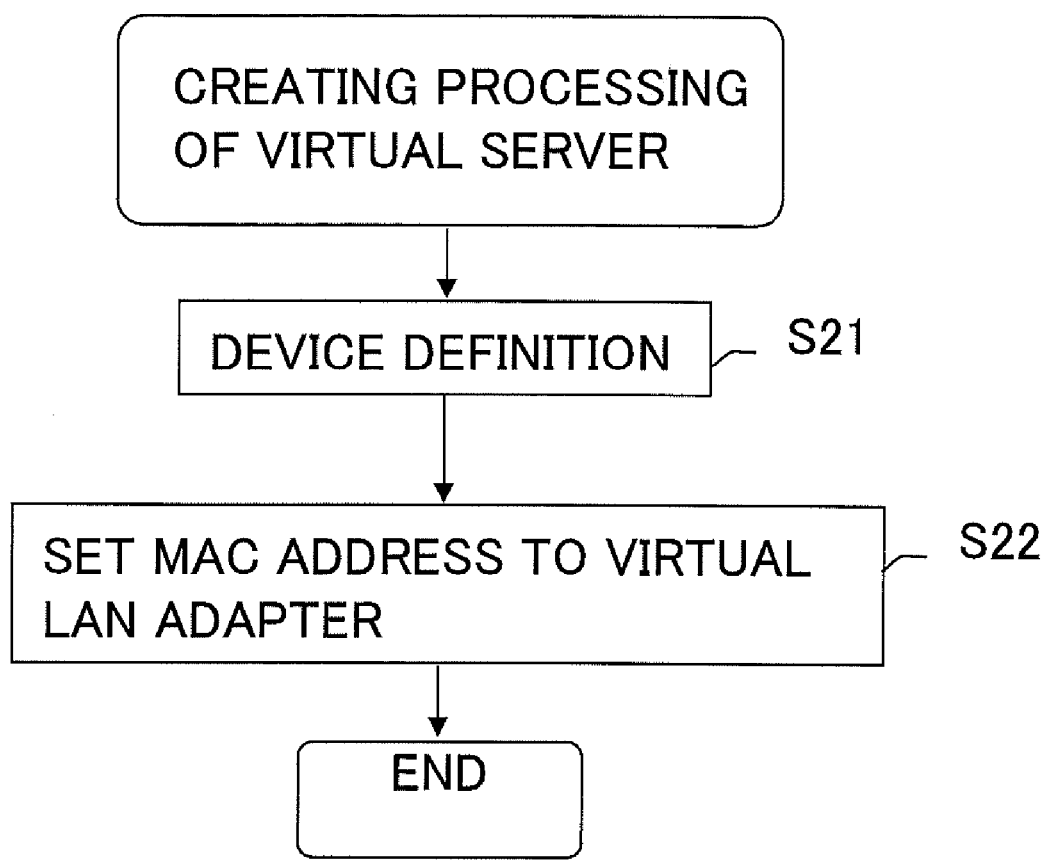
FIG. 8 is a flowchart of creating processing of a virtual server.

FIG. 8 illustrates a flowchart of creating processing of the virtual server.

Specifically, the host OS 12 defines the device such as the shared disk device 4 accessed by the virtual servers #1 to #3 or the virtual LAN adaptor upon creating the virtual servers #1 to #3 (in step S21). With this definition, a device converting table 141 is created for correspondence between the logical device name accessed by the virtual servers #1 to #3 and the physical device name.

FIGS. 9A and 9B are explanatory diagrams illustrating tables corresponding to create processing of the virtual servers.

FIG. 9A is an explanatory diagram illustrating a device converting table 141.

With respect to the virtual server #1, a logical device sd1 is defined corresponding to the physical device sda, and a logical device lan1 is defined corresponding to the physical device lana.

With respect to the virtual server #2, a logical device sd2 is defined corresponding to the physical device sdb, and the logical device lan1 is defined corresponding to the physical device lana.

With respect to the virtual server #3, a logical device sd3 is defined corresponding to the physical device sdc, and the logical device lan1 is defined corresponding to the physical device lana.

The description will be back to FIG. 8.

Subsequently, the host OS 32 temporarily sets the virtual-MAC address to the virtual LAN adaptor (in step S22).

The virtual-MAC addresses of the virtual LAN adaptors of the virtual servers #1 to #3 are obtained by reading the MAC addresses on the physical device lana. The virtual-MAC address is a temporarily virtual-MAC address. Further, the host OS 32 correlates the obtained virtual-MAC address with the logical device names lan1 of the guest OSs 31 to 33, and creates the device table B142.

FIG. 9B illustrates a device table B142.

The virtual-MAC address corresponding to the logical device name lan1 of the guest OS 31 is "00-00-0e-12-10-00".

The virtual-MAC address corresponding to the device name lan1 on the guest OS 32 is "00-00-0e-12-10-00".

The virtual-MAC address corresponding to the device name lan1 of the guest OS 33 is "00-00-0e-12-10-00".

Furthermore, a state of the activation of the virtual LAN adaptor corresponding to the guest OSs 31 to 33 is "0", i.e., inactivating state.

Then, the creating processing of the virtual server ends.

The description will be back to FIG. 5.

Subsequently, setting processing of the virtual LAN adaptor of the host OS 12 is performed for communication from the host OS 12 (in step S3 in FIG. 5). First of all, the host OS 12 defines the logical device lan1 corresponding to the physical device lana. Subsequently, the virtual-MAC address is set to the virtual LAN adaptor. Therefore, the virtual-MAC address determination unit 82 of the host OS 12 calculates and thus obtains the virtual-MAC address.

A value obtained by subtracting the network address from the IP address of the host OS 12 illustrated in FIG. 4 is added to the real-MAC address, thereby determining the virtual-MAC address of the host OS 12.

Since the subnet mask is "255.255.255.0", the first to twenty-fourth bits of the IP address correspond to the network address.

((IP address of host OS 12: 192.168.10.5)–(network address: 192.168.10.0))+(real-MAC address: "00-00-0e-12-10-00")=virtual-MAC address: "00-00-0e-12-10-05".

The determined virtual-MAC address is stored to a device table C151 as device data corresponding to the logical device lan1.

The host OS 12 sets the virtual-MAC address to the virtual LAN adaptor.

FIGS. 10A and 10B are explanatory diagrams illustrating tables corresponding to virtualizing processing of the host OS.

FIG. 10A illustrates the device table C151 indicating a correspondence between the logical device lan1 and the virtual-MAC address. The class "0" illustrates the virtual-MAC address.

The state for activating the virtual LAN adaptor is "0", and this means the inactivating state.

Subsequently, the host OS 12 creates initial information B152 for being transmitted to the monitoring center 100. Therefore, the host OS 12 reads the IP address and subnet mask corresponding to the device ID of the host OS 12 from the device ID table 121a illustrated in FIG. 4. Further, the virtual-MAC address is read from the device table C151 illustrated in FIG. 10A. Furthermore, the host OS 12 creates the initial information B152 of the host OS 12 on the basis of the information, and stores the created information to the memory 73. At this time, a mark B153 already-transmitted, corresponding to the initial information B152, is created to "0", and is then stored to the memory 73 (refer to FIG. 10B).

The initial information B152 comprises the device ID 1005, IP address 192.168.10.5, subnet mask 255.255.255.0, MAC address 00-00-0e-12-10-05, type "0", and class "0" of the host OS 12. The type "0" illustrates the initial information, and the class "0" illustrates the virtual-MAC address.

Subsequently, the virtual LAN adaptor of the host OS 12 is activated. At this time, a state indicating the activation of the device table C151 is set as activation "1" (refer to FIG. 10A).

The monitoring agent 62 of the host OS 12 periodically monitors a state of the device table C151. Further, the monitoring agent 62 detects the activation state "1" of the device table C151 and further detects that the mark B153 that is already transmitted is "0". Then, the initial information B152 is notified to the monitoring center 100.

The initial information B152 is transmitted to the monitoring center 100. Then, the mark B153 already-transmitted, corresponding to the initial information B152 stored in the memory 73, is changed to "1" (refer to FIG. 10B).

The description will be back to FIG. 5.

Subsequently, the host OS 12 starts the virtual servers #2 and #3, thereby individually starting processing of the guest OSs 32 and 33 (in step S4 in FIG. 5).

Figure 11:
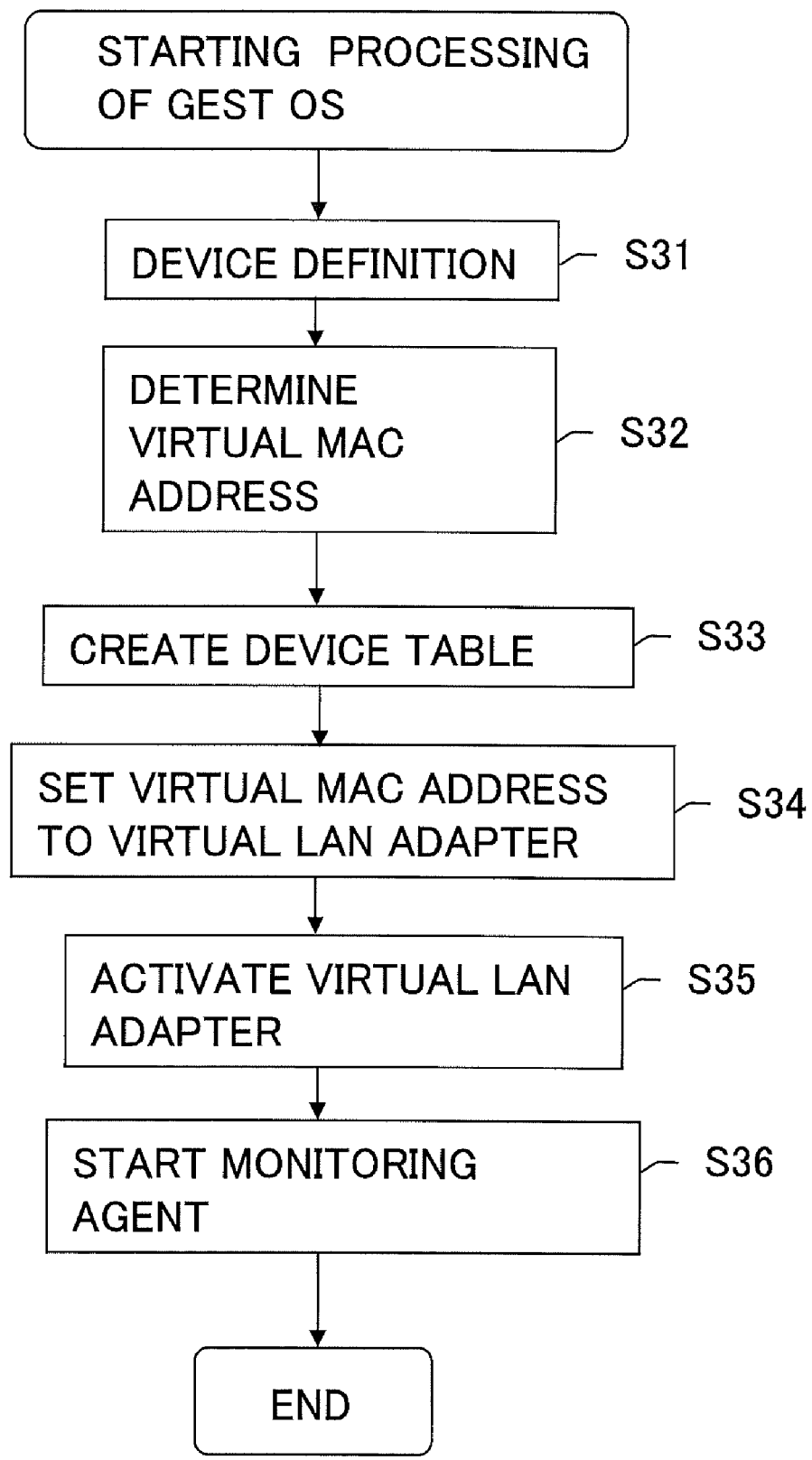
FIG. 11 is a flowchart of starting processing of a guest OS.

FIG. 11 illustrates a flowchart of the starting processing of the guest OS.

The guest OSs 32 and 33 perform processing after starting.

The guest OSs 32 and 33 are started. Then, the shared disk device 4 or LAN adaptor set to the virtual servers #2 and #3 is recognized, and correlates logical device names accessible from the application software 22 and 23 on the guest OSs 32 and 33 with a connecting device.

A device name table B161 indicating the logical device name and the access destination are created. That is, the device is defined (in step S31).

FIGS. 12A to 12C are explanatory diagrams illustrating tables corresponding to the starting processing of the guest OSs.

Although the tables are individually created for the guest OSs 32 and 33, a description thereof will be given in a lump.

FIG. 12A illustrates the device name table B161 for the guest OSs 32 and 33. The logical device names sd2 and sd3 individually correspond to logical disks 16 and 17. Further, the device name lan1 indicates the virtual LAN adaptor.

Subsequently, the guest OSs 32 and 33 temporarily read the virtual-MAC addresses (real-MAC addresses) that are already set in the virtual LAN adaptor, add values obtained by subtracting the network addresses from the IP addresses of the guest OSs 32 and 33 to the temporarily-read virtual-MAC address, and determines the virtual-MAC address (in step S32 in FIG. 11).

((IP address of guest OS 32: 1192.168.10.2)–(network address: 192.168.10.0))+(temporary virtual-MAC address (real-MAC address): "00-00-0e-12-10-00")=virtual-MAC address: "00-00-0e-12-10-02".

((IP address of guest OS 33: 192.168.10.3)–(temporary network address: 192.168.10.0))+(temporary virtual-MAC address (real-MAC address): "00-00-0e-12-10-00")=virtual-MAC address: "00-00-0e-12-10-03".

Subsequently, a new device table D162 (refer to FIG. 12B) in which contents of the MAC address of the device table B142 is changed to the determined virtual-MAC address is created (in step S33 in FIG. 11).

Subsequently, the guest OSs 32 and 33 respectively set the virtual-MAC addresses to the virtual LAN adaptor again (in step S34 in FIG. 11).

Subsequently, the guest OSs 32 and 33 respectively create the initial information C163, and store the created information to the memory 73. At this time, a mark C164 that is already transmitted corresponding to the device ID of the initial information C163 is created as "0", and is stored to the memory 73 (refer to FIG. 12C).

FIG. 12C illustrates the initial information C163 of the guest OSs 32 and 33, transmitted to the monitoring center 100. The device ID 1002, IP address 192.168.10.2, subnet mask 255.255.255.0, MAC address "00-00-0e-12-10-02", type "0", and class "0" correspond to the guest OS 32, device ID 1002, IP address 192.168.10.3, subnet mask 255.255.255.0, MAC address "00-00-0e-12-10-03", type "0", and class "0" illustrate the initial information C163 corresponding to the guest OS 33. The type "0" illustrates the initial information. The class "0" illustrates the virtual-MAC address.

Subsequently, the guest OSs 32 and 33 activate the virtual LAN adaptor to enter an operable state (in step S35 in FIG. 11). At this time, a state indicating the activation of the guest OSs 32 and 33 of the device table D162 is set to "1". The guest OS 31 is not used on the server A2, and is still in the state "0" as inactivation.

Subsequently, the guest OSs 32 and 33 start the monitoring agents 52 and 53 (in step S36 in FIG. 11).

The monitoring agents 52 and 53 detect that the state indicating the activation of the device tables D162 is "1", and further detects that a mark C164 that is already transmitted is "0". Then, initial information C163 is notified to the monitoring center 100.

The notification ends and the monitoring agents 52 and 53 then change the mark C164 that is already transmitted to the initial information C163 to "1" (refer to FIG. 12C).

Figure 13:
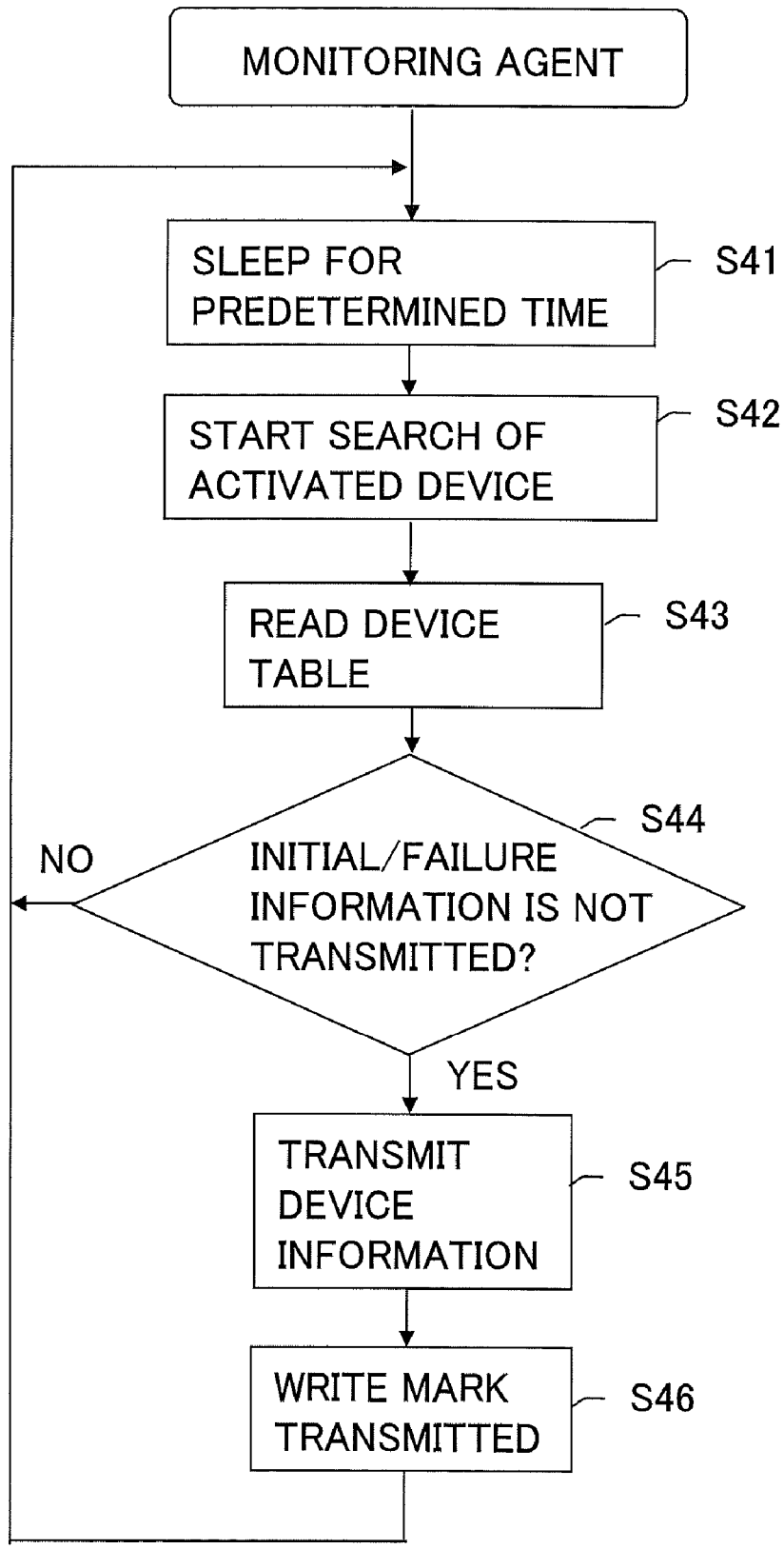
FIG. 13 is a flowchart of processing a monitoring agent.

FIG. 13 illustrates a flowchart of processing of the monitoring agent.

The monitoring agents 52, 53, and 62 perform processing in steps S41 to S46.

The monitoring agents 52, 53, and 62 sleep for a predetermined time (in step S41).

After ending the sleeping, the monitoring agents 52, 53, and 62 start the search of the corresponding activated devices (in step S42).

The monitoring agents 52, 53, and 62 read the corresponding device table A132, device table C151, and device table D162 for the purpose of searching the activated device (in step S43).

The monitoring agents 52, 53, and 62 check to see if the initial information A133, initial information B152, initial information C163, and failure information corresponding to the device in the activating state is not transmitted (in step S44).

When the corresponding initial information A133, initial information B152, initial information C163, and failure information are transmitted, the processing returns to step S41.

When the corresponding initial information A133; initial information B152, initial information C163, or failure information is not transmitted, the corresponding device information is transmitted to the monitoring center 100 (in step S45).

Subsequently, the mark that is already transmitted is written to the corresponding information stored in the memory 73 (in step S46). Subsequently, the processing returns to step S41.

A description will be given of processing of the servers A2 and B3 and the monitoring center 100 when the failure occurs at the servers A2 and B3 with reference to FIGS. 14 to 17.

FIG. 14 is an explanatory diagram illustrating the failure information. Failure information 171 indicates that of the device ID 1005, device ID 1002, and device ID 2001.

The guest OSs 32 and 33 are provided for the server A2, and the guest OS 31 is provided for the server B3. Further, the virtual servers #2, #3, and #4 are operated.

The failure information has the device ID, IP address, MAC address, failure contents, and type.

The type "1" indicates the failure information.

If a failure occurs on the hardware 11 of the server A2, the monitoring agent 62 operated on the host OS 12 detects the failure, and sends a notification indicating that the hardware is abnormal to the monitoring center 100.

Notified to the monitoring agent 62 are the device ID 1005, IP address 192.168.10.5, and MAC address "00-00-0e-12-10.05" as the failure information, an error number indicating the hardware is abnormal as the failure contents, and the type "1" indicating the failure information.

Further, when the software abnormality due to a failure of the hardware 11 occurs at the virtual server #2, the monitoring agent 52 detects the abnormality, and sends a notification indicating the software abnormality to the monitoring center 100.

Notified to the monitoring agent 52 are the device ID 1002, IP address 192. 168.10.2. and MAC address "00-00-0e-12-10-02" as the failure information, an error number of the software abnormality as the failure contents, and type "1".

Further, when the software abnormality occurs at the virtual server #4 of the server B3, the monitoring agent 51 detects the abnormality, and sends a notification indicating the software abnormality to the monitoring center 100.

The monitoring agent 51 of the virtual server #4 of the server B3 sends a notification indicating the device ID 2001, IP address 192.168.10.1, and MAC address "00-00-0e-12-20-01" as the failure information, an error number of the software abnormality, and type "1" to the monitoring center 100.

Figure 15:
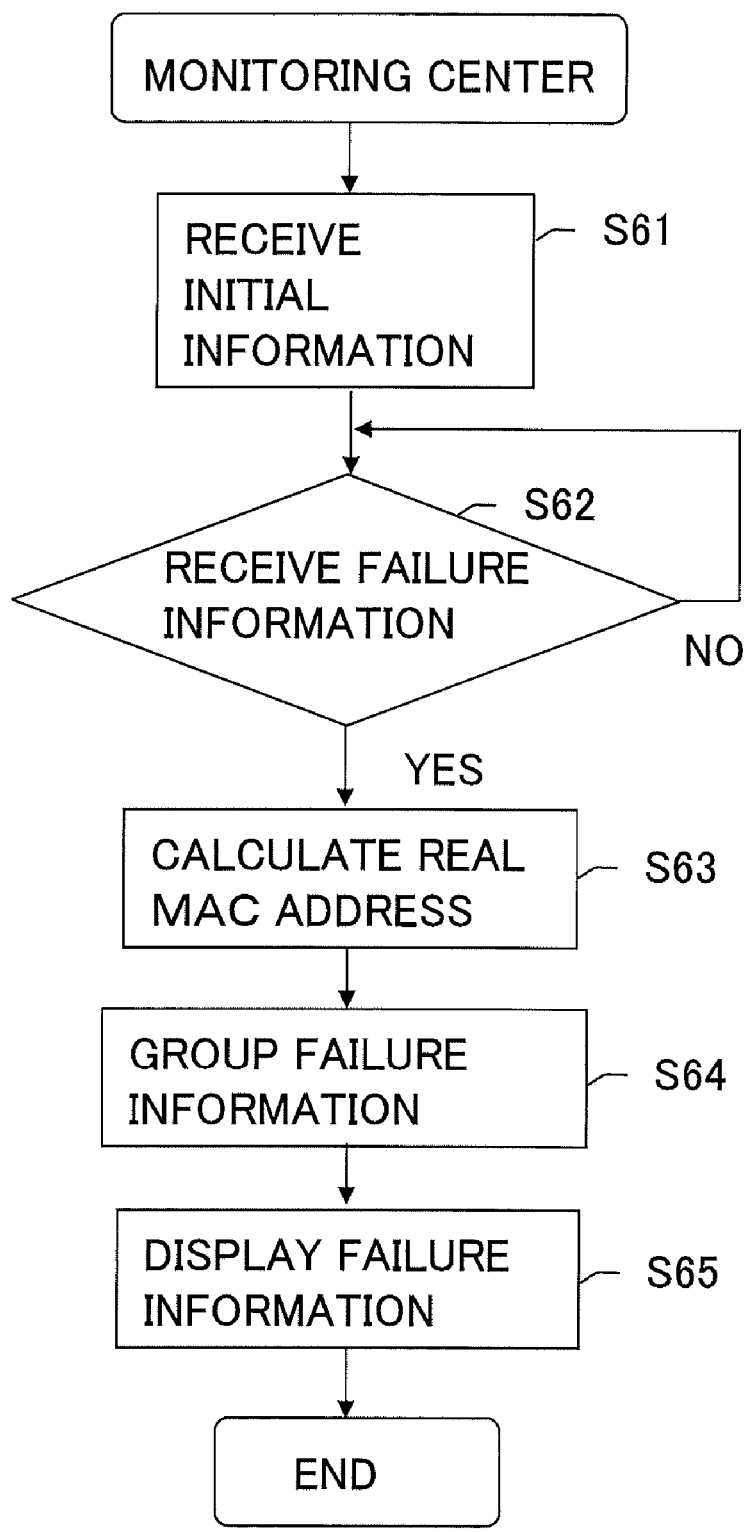
FIG. 15 is a flowchart of processing of a monitoring center.

FIG. 15 illustrates a flowchart of processing of the monitoring center.

The monitoring center 100 receives the initial information on the servers A2 and B3, and stores the received information as the monitoring table to the initial information storage unit 110 (in step S61).

FIG. 16 is an explanatory diagram illustrating the monitoring table.

Information corresponding to the device IDs 1002 to 1005 in the monitoring table 181 is the initial information of the server A2. Further, the information corresponding to the device IDs 2001 and 2005 is the initial information on the server B3.

Subsequently, the monitoring center 100 receives failure information, and stores the received information to the failure information storage unit 111 (in step S62). The real-MAC address obtaining unit 112 calculates back a physical MAC address from the IP address and virtual-MAC address in the failure information notified by the server A2.

Further, the real-MAC address is calculated back from the IP address and virtual-MAC address in the failure information notified by the server B3 (in step S63).

First, the real-MAC address is obtained from the failure information of the hardware abnormality of the server A2. The reduction formula is (virtual-MAC address="00-00-0e-12-10-05")–(IP address=192.168.10.5-network address=192.168.10.0)=real-MAC address="00-00-0e-12-10-00".

The real-MAC address information is obtained from the failure information of the software abnormality of the server A2. The conversion formula is (virtual-MAC address: "00-00-0e-12-10-02")–((IP address: 192.168.10.2)-(network address: 192.168.10.0))=real-MAC address: "00-00-0e-12-10-00".

On the other hand, the real-MAC address information is obtained the failure information of the software abnormality of the server B3.

The conversion formula is (virtual-MAC address: "00-00-0e-12-20-01")–((IP address: 192.168.10.1)–(network address: 192.168.10.0))=real-MAC address: "00-00-0e-12-20-00".

Subsequently, the device ID is correlated with the real-MAC address obtained by the grouping processing unit 113.

That is, the failure information is grouped to the device ID 1005 on the basis of the real-MAC address; "00-00-0e-12-10-00". Further, the failure information is grouped to the device ID 2005 on the basis of the real-MAC address: "00-00-0e-12-20-00" (in step S64). The grouped information is stored to the failure information storage unit 111.

Subsequently, the output unit 114 displays the grouped information (in step S65).

FIG. 17 illustrates a display example.

The failure information is grouped to the device ID 1005 indicating the server A2. The first failure information of the server A2 indicates that the occurrence date is on 1 Jan. 2007, time is 10:01:00, device ID is 1005, the hardware is abnormal, and the group is 00-00-0e-12-10-00. Further, the second failure information of the server A2 indicates that the occurrence date is on 1 Jan. 2007, time is 10:01:03, the device ID is 1002, the software is abnormal, and the group is 00-00-0e-12-10-00. The failures occur at close times and are displayed as relevant occurring ones.

Furthermore, the failure information is grouped to the device ID 2005 indicating the server B3. The failure information of the server B3 indicates that the occurrence date is on 1 Jan. 2007, time is 10:03:01, the device ID 2005, the software abnormality, and the group 00-00-0e-12-20-0.

In the case of the server A2, the software becomes abnormal due to the hardware abnormality. Therefore, only the hardware abnormality may be recovered. The inspection of the software abnormality is not required. As mentioned above, since the failure information is collected as a group of the same notification every device ID. Therefore, the support person may not correspond to a plurality of pieces of the failure information having the same cause.

In the case of the server B3, information on the hardware is not stored to the group information with respect to a trouble detected by the guest OS 31. Therefore, this can be determined as a trouble detected by the software.

With the monitoring system 1, the failure information can be correlated on the monitoring center 100 side every monitored device. Therefore, the information on the failure on the software, caused by the hardware can be immediately determined on the monitoring center 100 side. In this case, processing may be performed so as only to recover the failure of the hardware, thereby enabling efficient support. Further, it is easy determine whether the software failure that is not correlated to the failure of the hardware is caused in the server A2 or the server B3. Therefore, fast correspondence is possible for failure analysis.

Moreover, since the device IDs and the real MAC addresses of the servers A2 and server B3, the device IDs of and the virtual-MAC addresses of the virtual servers #1 to #6 are automatically transmitted to the monitoring center 100, all various information on the monitored device may not be registered in advance on the monitoring center side.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A monitoring system comprising:
 a monitored device to operate virtual computers on a real computer, said monitored device including
  an initial information notification unit to transmit initial information having device identification information of the real computer and a real MAC address of the real computer,
  a determination unit to determine a virtual MAC address of each of the real and virtual computers on the basis of the real MAC address of the real computer and an IP address of each of the real and virtual computers, and
  a failure information notification unit to transmit failure information having the virtual MAC address of a failured one of the real and virtual computers and the IP address of the failed one of the real and virtual computers upon the one of the real and virtual computers failure occurring; and
 a monitoring device to monitor a failure state of the monitored device, said monitoring device including
  a storage unit to store the initial information received from the monitored device,
  an obtaining unit to obtain the real MAC address of the real computer on the basis of the IP address and the virtual MAC address in the failure information received from the monitored device,
  a group processing unit to group the failure information on the basis of the obtained real MAC address, and to correlate the grouped failure information with the device identification information in the initial information, and
  an output unit to output the failure information correlated with the device identification information.

2. The monitoring system according to claim 1, wherein the determination unit adds a value obtained by subtracting a network address from the IP address to the real MAC address to determine the virtual MAC address.

3. The monitoring system according to claim 1, wherein the obtaining unit subtracts a value obtained by subtracting a network address from the IP address from the virtual MAC address information to obtain the real MAC address.

4. The monitoring system according to claim 1, further comprising a shared disk device that stores a plurality of the virtual computers, wherein the virtual computers are distributed into a plurality of monitored devices from the shared disk device.

5. A monitoring device to monitor a failure state of a monitored device, the monitored device storing a plurality of virtual computers on a real computer, the monitoring device comprising:
   a storage unit to store initial information received from the monitored device, the initial information having device identification information of the real computer and a real MAC address of the real computer;
   an obtaining unit to obtain the real MAC address of the real computer on the basis of an IP address and a virtual MAC address in failure information received from the monitored device;
   a group processing unit to group the failure information on the basis of the obtained real MAC address, and to correlate the grouped failure information with the device identification information in the initial information; and
   an output unit to output the failure information correlated with the device identification information.

6. The monitoring device according to claim 5, wherein the obtaining unit subtracts a value obtained by subtracting a network address from the IP address from the virtual MAC address information to obtain the real MAC address.

7. A monitored device to operate virtual computers on a real computer, said monitored device comprising:
   an initial information notification unit to transmit initial information having device identification information of the real computer and a real MAC address of the real computer,
   a determination unit to determine a virtual MAC address of each of the real and virtual computers on the basis of the real MAC address of the real computer and an IP address of each of the real and virtual computers, and
   a failure information notification unit to transmit failure information having the virtual MAC address of a failured one of the real and virtual computers and the IP address of the failed one of the real and virtual computers upon the one of the real and virtual computers failure occurring.

8. The monitored device according to claim 7, wherein the determination unit adds a value obtained by subtracting a network address from the IP address to the real MAC address to determine the virtual MAC address.

9. A monitoring method to monitor a failure state of a monitored device, the monitored device storing a plurality of virtual computers on a real computer, said monitoring method comprising:
   storing initial information received from the monitored device, the initial information having device identification information of the real computer and a real MAC address of the real computer;
   obtaining the real MAC address of the real computer on the basis of an IP address and a virtual MAC address in failure information received from the monitored device;
   grouping the failure information on the basis of the obtained real MAC address, and correlating the grouped failure information with the device identification information in the initial information; and
   outputting the failure information correlated with the device identification information.

* * * * *